United States Patent
Worthington

(10) Patent No.: US 6,494,513 B2
(45) Date of Patent: Dec. 17, 2002

(54) HAND TOOL FOR GRIPPING AND CARRYING OBJECTS

(76) Inventor: Gary Landon Worthington, 1268 Landsburn Cir., Westlake Village, CA (US) 91361

( * ) Notice: Subject to any disclaimer, the term of this patent is extended or adjusted under 35 U.S.C. 154(b) by 0 days.

(21) Appl. No.: 10/080,238

(22) Filed: Feb. 21, 2002

(65) Prior Publication Data

US 2002/0121792 A1 Sep. 5, 2002

Related U.S. Application Data

(60) Provisional application No. 60/272,694, filed on Mar. 1, 2001.

(51) Int. Cl.[7] ................................................. B65G 7/12
(52) U.S. Cl. ............................ 294/16; 294/92; 294/104
(58) Field of Search ................................ 294/15, 16, 17, 294/27.1, 28, 31.1, 62, 63.1, 90, 92, 101, 103.1, 104, 106, 903

(56) References Cited

U.S. PATENT DOCUMENTS

| | | | |
|---|---|---|---|
| 1,109,190 A | 9/1914 | Werner | |
| 1,162,273 A | 11/1915 | Wilson | |
| 1,251,278 A | * 12/1917 | Porter | ............. 294/15 |
| 1,279,274 A | 9/1918 | Comrie | |
| 1,479,711 A | 1/1924 | Haarberg | |
| 1,533,934 A | * 4/1925 | Lutz | ............. 294/62 |
| 2,369,727 A | * 2/1945 | Falkner | ............. 294/62 |
| 2,393,101 A | 1/1946 | Gardner | |
| 2,665,162 A | 1/1954 | Moore et al. | |
| 2,708,592 A | 5/1955 | Dalkranian | |
| 2,776,856 A | 1/1957 | Ingram | |
| 2,967,730 A | 1/1961 | Vann | |
| 3,041,101 A | 6/1962 | Lebre | |
| 3,253,849 A | 5/1966 | Hansen | |
| 3,333,883 A | 8/1967 | Kikuchi | |
| 3,374,024 A | * 3/1968 | Reynolds | ............. 294/16 |
| 3,524,670 A | * 8/1970 | Ilich | ............. 294/16 X |
| 3,820,837 A | * 6/1974 | Fredrickson | ........... 294/903 X |
| 3,851,358 A | * 12/1974 | Janosko | ............. 294/104 |
| 5,820,180 A | 10/1998 | Haupt | |
| 5,871,244 A | 2/1999 | Langford | |
| 6,113,167 A | 9/2000 | Mattis et al. | |

FOREIGN PATENT DOCUMENTS

| | | | | |
|---|---|---|---|---|
| DE | 811699 | * | 8/1951 | ............. 294/16 |
| DE | 1286457 | * | 1/1969 | ............. 294/16 |
| SE | 36090 | * | 1/1914 | ............. 294/16 |

* cited by examiner

*Primary Examiner*—Johnny D. Cherry
(74) *Attorney, Agent, or Firm*—Kelly Bauersfeld Lowry & Kelley, LLP

(57) ABSTRACT

A hand tool for gripping and moving building materials includes a linkage having a grip at a first end. A plate having a gripping face is pivotally attached to a second end of the linkage. A generally U-shaped bracket is pivotally attached to the linkage adjacent to the plate and extends beyond the second end of the linkage so that a gripping face thereof is disposed generally opposite the plate gripping face. Upon inserting a building material between the plate and bracket gripping faces and lifting the linkage upwardly, the plate and bracket pivot so that the gripping faces firmly contact and grip opposite sides of the building material for transport.

18 Claims, 3 Drawing Sheets

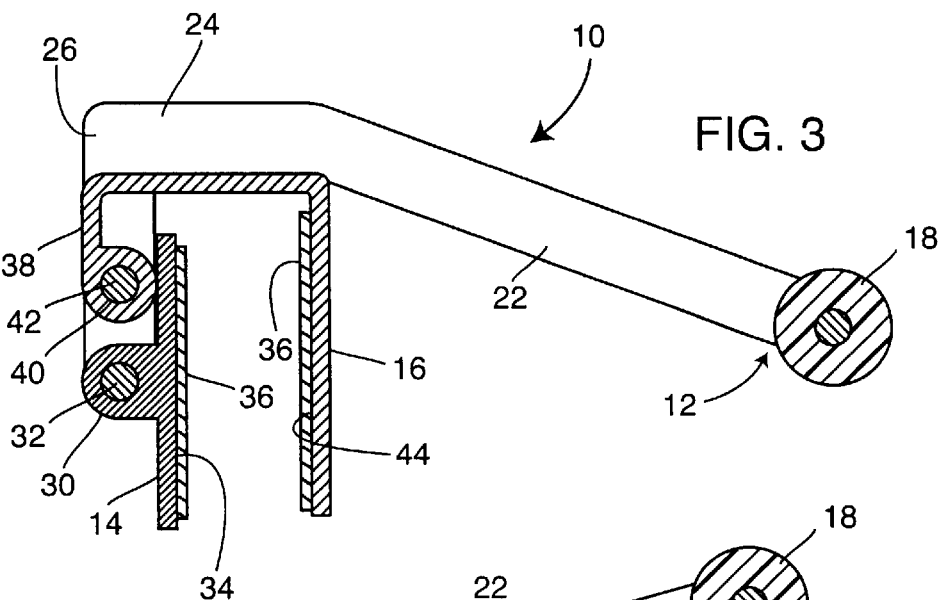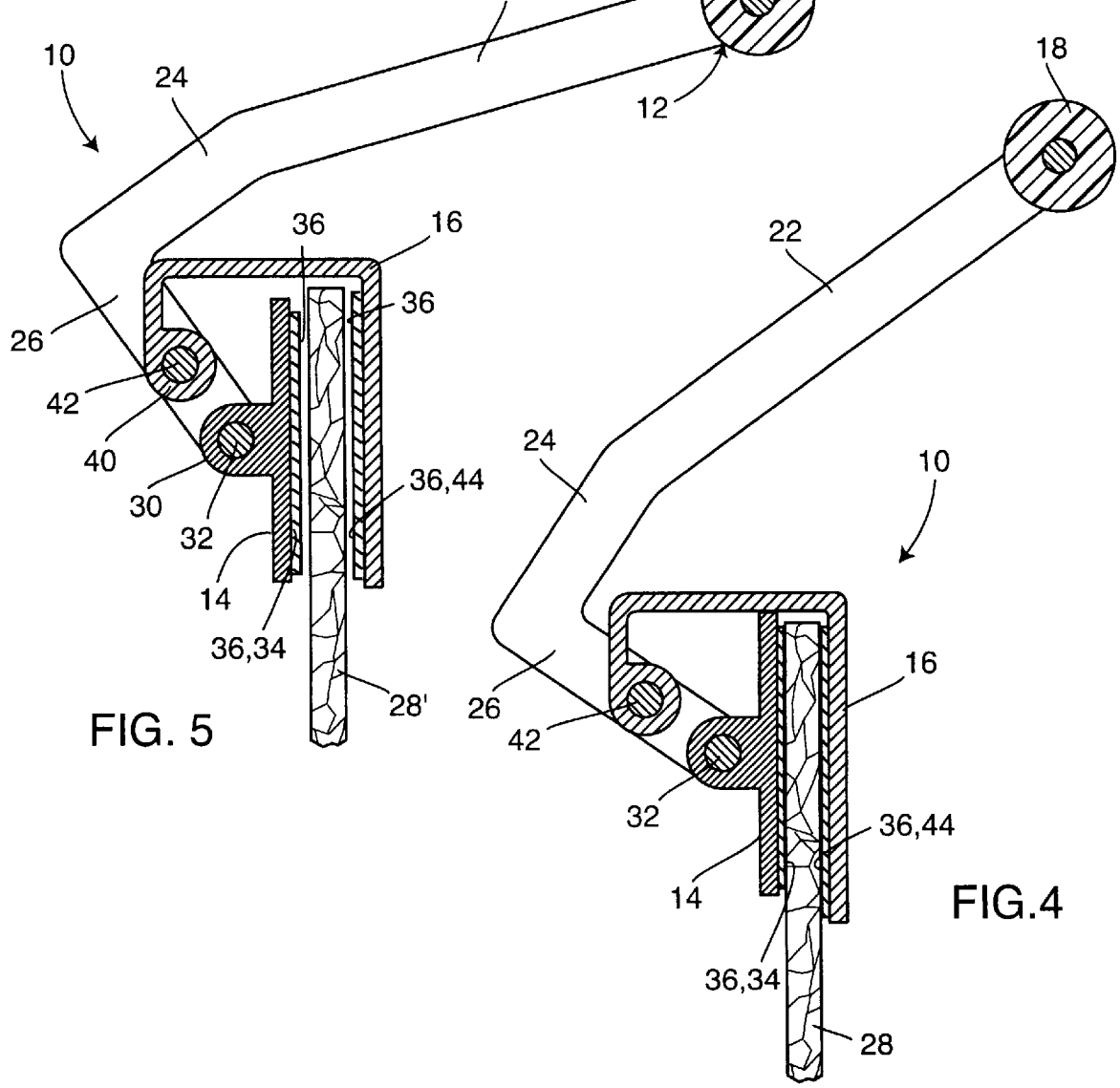

HAND TOOL FOR GRIPPING AND CARRYING OBJECTS

RELATED APPLICATION

The present application claims priority from United States provisional application Ser. No. 60/272,694 filed Mar. 1, 2001.

BACKGROUND OF THE INVENTION

The present invention generally relates to tools for use in building construction. More particularly, the present invention relates to a hand tool which is designed to hold and grip heavy and/or unwieldy materials used in the construction of buildings and the like.

In the construction industry, there are a variety of building materials which are large in size, heavy or otherwise unwieldy. Such materials include panels, boards and sheets of dry wall wallboard, plasterboard, sheet rock, plywood, particle board, pressed-wood, melamine, granite, marble and glass.

Although pallets of these materials may be loaded onto a truck bed for delivery to the construction site, or even lifted by crane to areas of the construction site or levels of the building being constructed, they still must be individually transported to their final destination within the building structure. Although such materials are often heavy, they are capable of being carried to their final destination by only one or two construction workers. The difficulty in transporting these materials lies in the fact that they are very large. For example, a sheet of plywood can be four to six feet in width and eight feet or more in length. Such materials typically lack handle holds or apertures for grasping. Thus, to carry a sheet of material, a construction worker typically grasps an edge of the material tightly between the fingers and palms of his hands and lifts the sheet of material a few inches off the ground while walking to deliver the sheet of material to its final destination. Not only awkward, this method of carrying such sheets of material fatigues the worker's hands, arms, upper torso and neck.

Some of these materials, such as glass or marble, can be quite slippery and slip out from the grasp of the construction worker's hands. Such falls can render the sheet of material at least partly if not fully useless, resulting in increased cost for the construction project.

Accordingly, there is a need for a tool which is designed to assist a construction worker in gripping and holding unwieldy panels and sheets of construction material. Such a tool should be configured so as to grasp such sheets firmly without damaging the material. Such a tool should also enable the construction worker to more naturally hold and carry the sheet of material such that the weight is distributed over the construction worker's body, instead of in front of or to the side of the body, to prevent fatigue and injury. The present invention fulfills these needs and provides other related advantages.

SUMMARY OF THE INVENTION

The present invention resides in a hand tool for gripping and moving building materials, such as sheets and panels of material. The hand tool generally comprises a linkage including a grip at a first end thereof, and a plate pivotally attached to a second end of the linkage and having a gripping face. A bracket is pivotally attached to the linkage intermediate the first and second ends thereof. The bracket extends beyond the second end of the linkage and has a gripping face disposed generally opposite the gripping face of the plate. Upon inserting a building material between the plate and bracket gripping faces and lifting the linkage upwardly, the plate and bracket pivot so that the gripping faces thereof firmly contact and grip opposite sides of the building material.

The linkage generally comprises a pair of support arms attached to opposite ends of the grip so as to be generally parallel with one another. The support arms are each L-shaped in configuration, having integral first and second sections that are angularly offset from one another. In a particularly preferred embodiment, the first and second sections of each support arm are angularly offset by twenty-two degrees.

The bracket is generally U-shaped. The plate and bracket gripping surfaces are generally flat, and may include a cushion insert attached thereto to enhance the frictional contact with the building material, as well as preventing scratches and marring of finished surfaces of the building material, such as when the building material comprises glass, marble, etc. The insert may be comprised of a rubber material to achieve these objectives.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a cross-sectional view of the hand tool of FIGS. 1 and 2 in a relaxed and open state;

FIG. 4 is a cross-sectional view taken generally along line 4—4 of FIG. 1, illustrating the gripping of a relatively thin sheet of building material; and FIG. 5 is a cross-sectional view similar to FIG. 4, illustrating the hand tool gripping a sheet of building material of greater thickness.

DETAILED DESCRIPTION OF THE PREFERRED EMBODIMENT

Figure 1:
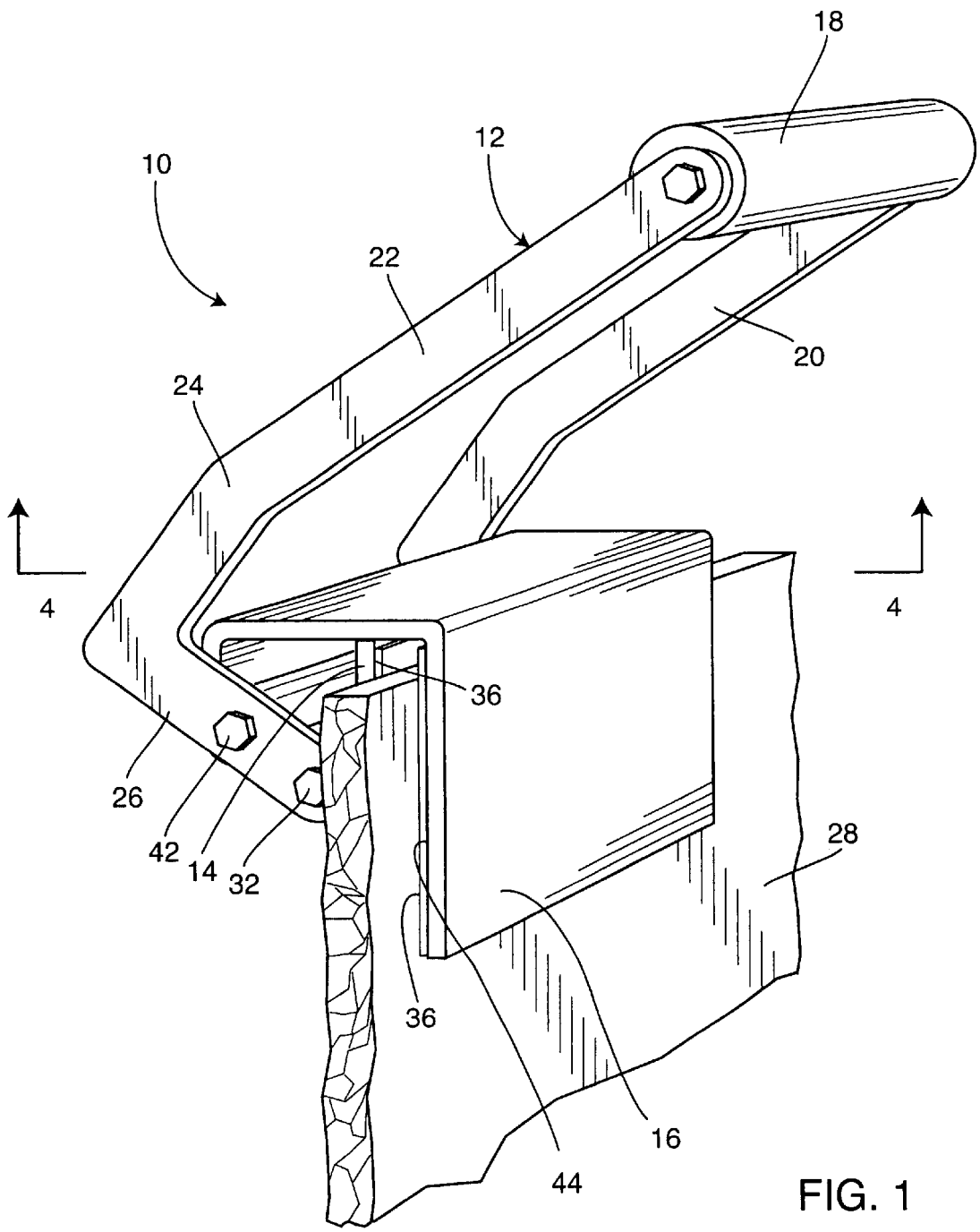
FIG. 1 is a front perspective view of a hand tool embodying the present invention gripping a sheet of building material.

As shown in the drawings for purposes of illustration, the present invention is concerned with a tool, generally referred to by the reference number 10, which is designed to grip and hold panels, sheets and other similarly bulky and/or heavy construction materials to facilitate their transport from one location to another.

Figure 2:
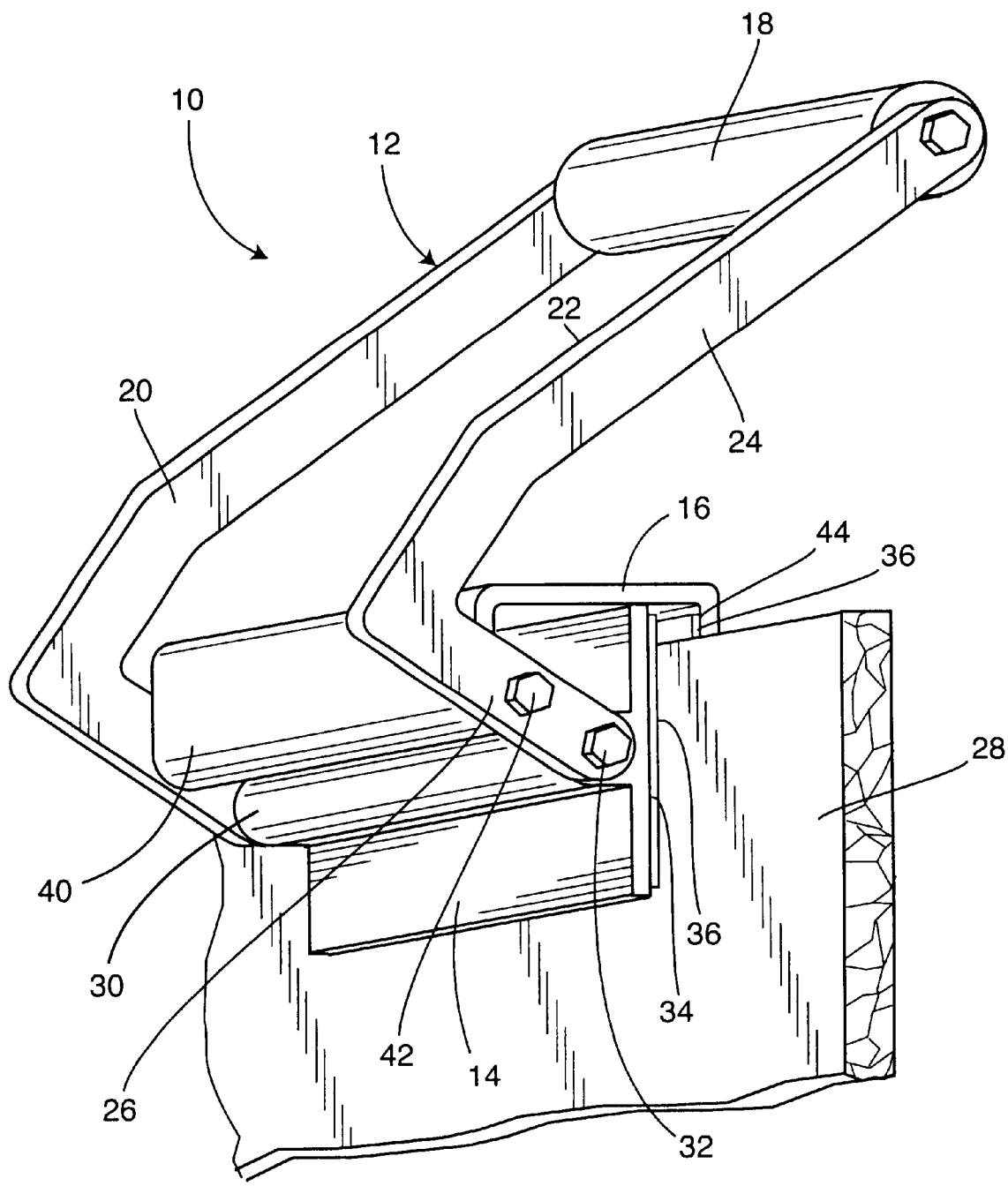
FIG. 2 is a rear perspective view of FIG. 1.

With reference now to FIGS. 1–3, the tool 10 is generally comprised of a linkage 12, a plate 14 pivotally attached to an end of the linkage 12, and a generally U-shaped bracket 16 pivotally attached to the linkage adjacent to the plate 14. The linkage 12 includes a grip 18 attached to first ends of support arms 20 and 22. The grip 18 is preferably cylindrical so as to be held in the palm of the construction worker's hand, and the support arms 20 and 22 are attached at the ends of the grip 18 so as to be generally parallel with respect to one another.

The support arms are comprised of a durable material, such as aluminum or steel. The support arms 20 and 22 each have a generally L-shaped configuration. Each arm 20 and 22 includes a first section 24, and an integral second section 26 that is shorter than the first section 24, and angularly offset from the first section 24. In a particularly preferred embodiment the first sections 24 of the arms 20 and 22 are not straight but have an angular offset by approximately 22°. It has been found that such an angle provides an earlier and tighter grip upon the building material 28 and also provides more leverage and comfort to the construction worker. However, it should be understood that the invention is not necessarily limited to such an angle, so long as the operation of the hand tool 10 achieves the desired results.

The plate 14 is pivotally attached to the second ends of the support arms 20 and 22. An elongated passageway 30 is formed on a back surface of the plate 14, such as by casting the passageway 30 onto the plate 14 or attaching a hollow member thereto. The passageway 30 is open at either end and alignable with apertures of the support arms 20 and 22 for acceptance of a bolt 32 or the like which creates a hinge allowing the plate 14 to swivel on the bolt 32. The passageway 30 is preferably positioned along a center line of the plate 14, although it is not limited to such and can be positioned where deemed appropriate. A generally flat surface of the plate 14 generally opposite the passageway 30 comprises a gripping face 34. In order to prevent damage to the surface of the sheet of building material 28, such as scratching, marring, etc., a cushion insert 36 is attached to the gripping face 34. Typically, the insert 36 comprises a durable rubber material which prevents the aforementioned scratching and marring. Preferably, the insert 36 has a roughened or frictional surface to facilitate the frictional hold on the building material 28.

The bracket 16 is generally U-shaped and includes a relatively short extension 38 defining an open ended passageway 40 at or near an end thereof, which is formed during the casting process or by curling the end of the extension inward. The hollow passageway 40 is aligned with apertures formed in the support arms 20 and 22 intermediate the ends thereof, and typically adjacent to the pivot point 32 of the plate 14 through which a bolt 42 or the like can be inserted to create a hinge to allow the bracket 16 to swivel in a manner similar to the plate 14. The bracket 16 extends beyond the second ends of the support arms 20 and 22 to define a gripping face 44 which is generally disposed opposite the gripping face 34 of plate 14, and spaced somewhat therefrom.

Preferably, the gripping face 44 of the bracket 16 also includes a cushion insert 36 attached thereto, as described above. The portion of the bracket 16 defining the gripping face 44 is typically much longer than the opposite surface 38 defining the pivot point 42. The configuration of the bracket 16, in cooperation with the pivoting plate 14, allows the tool 10 to be positioned over any free edge of the building material 28 as the bracket 16 extends beyond the end of the linkage 12.

The plate 14 and bracket 16 each independently swivel or pivot along their respective pivoting hinges 32 and 42. This allows the gripping surfaces 34 and 44 to be oriented so that they are exactly parallel to one another, but can also independently swivel out of this parallel position.

As illustrated in FIGS. 4 and 5, the gripping faces 34 and 44 of the tool 10 remain parallel to each other when the tool 10 has been placed over the panel of material 28 or 28' regardless of the thickness of the building material 28 or 28', so long as the thickness is within the range permitted by the tool 10. The frictional engagement of the gripping faces 34 and 44, combined with the action of gravity, provides and maintains a positive gripping of the sheet of material 28 or 28'.

The degree of swivel or pivoting of the plate 14 and bracket 16, and the distance between the gripping faces 34 and 44 can be somewhat adjusted by the spacing of the bolts 32 and 42, altering the sizes of the plate 14 and bracket 16 or changing the position of the passageway 30 on the rear surface of the plate 14. The tool 10 can clamp or grasp onto construction materials having a thickness from several inches to as little as a fraction of an inch. In order to accommodate greater, or lesser, thicknesses, the alterations of the relative size or position of the plate 14 or bracket 16 can be modified as described above. For example, the bracket 16 can be increased in width so that the tool 10 can grab and lift concrete blocks, for example, having a thickness of several inches.

Notwithstanding these alterations, the specific design of the plate 14 and bracket 16, their geometric shapes, and the relative positions of their hinges 32 and 42 permit the gripping faces 34 and 44 to open from each other sufficiently to slide over an exposed edge of panels, boards, blocks, etc., but then to swivel and rock into a precisely parallel position with respect to one another when the grip 18 is lifted upward or inward, exerting significant pressure upon the gripping faces 34 and 44 as the linkage 12 and sheet of building material 28 are lifted.

Use of the tool 10 of the present invention significantly reduces the stress and potential injuries of the fingers, hands, wrists and back of the construction worker. The tool 10 reduces the likelihood of dropping or losing control over the materials 28 while handling, lifting, pulling, pushing or otherwise moving or holding them. As the grip 18 can be firmly grasped in the user's palm in comfortable fashion, the construction worker can carry such materials up ladders, across roof tops and through construction sites with relative ease. The configuration of the tool 10 also enables the construction worker to handle and lift objects which are larger and much heavier in weight than is otherwise possible or practical. Upon grasping the sheet of construction material 28 with the tool 10, the construction worker can also reposition the sheet 28 so that the top edge of the sheet of construction material is lifted by the tool 10 with one hand and carried by the construction worker with the tool 10 above the shoulder instead of the awkward and painful positions of the side and front of the worker.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A hand tool for gripping and moving building materials, the hand tool comprising:

a linkage comprising a grip attached to first ends of a pair of support arms;

a generally planar plate extending between second ends of the support arms so as to be freely pivotable, the plate having a surface defining a gripping face;

a generally U-shaped bracket extending between the support arms intermediate the first and second ends thereof so as to be freely pivotable, the bracket extending beyond the second end of the linkage and having a surface defining a gripping face disposed generally opposite the gripping face of the plate;

wherein upon inserting a building material between the plate and bracket gripping faces and lifting the linkage upwardly, the plate and bracket pivot so that the gripping faces thereof firmly contact and grip opposite sides of the building material.

2. The hand tool of claim 1, wherein the pair of support arms are generally parallel with one another.

3. The hand tool of claim 1, wherein the support arms are each generally L-shaped in configuration.

4. The hand tool of claim 3, wherein the support arms each include a first section that is angularly offset by approximately twenty-two degrees.

5. The hand tool of claim 1, wherein the plate and bracket gripping faces are generally flat.

6. The hand tool of claim 1, wherein the bracket is generally U-shaped.

7. The hand tool of claim 1, including a cushion insert attached to the plate and bracket gripping faces.

8. The hand tool of claim 7, wherein the insert is comprised of a rubber material.

9. A hand tool for gripping and moving building materials, the hand tool comprising:
   a linkage comprising a grip attached to first ends of a pair of support arms, the support arms being disposed generally parallel to one another;
   a generally planar plate extending between second ends of the support arms so as to be freely pivotable, the plate having a surface defining a generally flat gripping face;
   a bracket extending between the support arms intermediate the first and second ends thereof so as to be freely pivotable, the bracket extending beyond the second end of the linkage and having a surface defining a generally flat gripping face disposed generally opposite the gripping face of the plate;
   wherein upon inserting a building material between the plate and bracket gripping faces and lifting the linkage upwardly, the plate and bracket pivot so that the gripping faces thereof firmly contact and grip opposite sides of the building material.

10. The hand tool of claim 9, wherein the support arms are each L-shaped in configuration.

11. The hand tool of claim 10, wherein the support arms each include a first section that is angularly offset by approximately twenty-two degrees.

12. The hand tool of claim 9, wherein the bracket is generally U-shaped.

13. The hand tool of claim 9, including a cushion insert attached to the plate and bracket gripping faces.

14. The hand tool of claim 13, wherein the insert is comprised of a rubber material.

15. A hand tool for gripping and moving building materials, the hand tool comprising:
   a linkage comprising a grip attached to first ends of a pair of generally L-shaped support arms disposed parallel to one another;
   a generally planar plate extending between second ends of the support arms so as to be freely pivotable, the plate having a surface defining a generally flat gripping face;
   a generally U-shaped braket extending between the support arms intermediate the first and second ends thereof so as to be freely pivotable, the braket extending beyond the second end of the linkage and having a surface defining a generally flat gripping face disposed generally opposite the gripping face of the plate;
   wherein upon inserting material between the plate and braket gripping faces and lifting the linkage upwardly, the plate and bracket pivot so that the gripping faces.

16. The hand tool of claim 15, wherein the support arms each include proximately twenty-two degrees.

17. The hand tool of claim 15, including a cushion insert attached to the plate and bracket gripping faces.

18. The hand tool of claim 17, wherein the insert is comprised of a rubber material.

* * * * *